United States Patent
Kim et al.

(10) Patent No.: US 9,720,503 B2
(45) Date of Patent: Aug. 1, 2017

(54) VIBRATION CONTROL DEVICE AND COMPUTING DEVICE INCLUDING THE SAME

(71) Applicant: Samsung Electronics Co., Ltd., Suwon-si, Gyeonggi-do (KR)

(72) Inventors: Je Kook Kim, Yongin-si (KR); Min Shik Seok, Suwon-si (KR); Seon Mi Jeon, Cheongju-si (KR); Seong Wook Hwang, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/001,890

(22) Filed: Jan. 20, 2016

(65) Prior Publication Data
US 2016/0334872 A1  Nov. 17, 2016

(30) Foreign Application Priority Data

May 11, 2015  (KR) ......................... 10-2015-0065087

(51) Int. Cl.
| | |
|---|---|
| H04B 3/36 | (2006.01) |
| G06F 3/01 | (2006.01) |
| G08B 6/00 | (2006.01) |

(52) U.S. Cl.
CPC ............. *G06F 3/016* (2013.01); *G08B 6/00* (2013.01)

(58) Field of Classification Search
CPC .................................. G06F 3/016; G08B 6/00
USPC ..................................................... 340/407.1
See application file for complete search history.

(56) References Cited

U.S. PATENT DOCUMENTS

| | | | |
|---|---|---|---|
| 5,451,924 A * | 9/1995 | Massimino | ............ B25J 9/1689 340/4.11 |
| 7,301,094 B1 | 11/2007 | Noro et al. | |
| 7,616,537 B2 | 11/2009 | Kim et al. | |
| 7,664,808 B2 * | 2/2010 | Jiang | .................. H03H 17/0607 708/319 |
| 8,624,857 B2 | 1/2014 | Cheung et al. | |
| 8,717,152 B2 | 5/2014 | Bhatia et al. | |

(Continued)

FOREIGN PATENT DOCUMENTS

| | | |
|---|---|---|
| KR | 100486277 B1 | 4/2005 |
| KR | 100498455 B1 | 7/2005 |

OTHER PUBLICATIONS

Burk, Brian, "Benefits of Auto-Resonance Tracking," Texas Instruments, Application Report, SLOA188, 2013, pp. 1-9.

(Continued)

*Primary Examiner* — Kerri McNally
(74) *Attorney, Agent, or Firm* — Harness, Dickey & Pierce, P.L.C.

(57) ABSTRACT

A vibration control device configured to provide a haptic function and control a vibration device driven by a sine wave. The vibration control device includes a sampling frequency signal generator and a sine wave synthesizer. The vibration control device is configured to generate a sampling frequency signal using a clock signal, wherein the sampling frequency signal is related to an operation cycle of a digital filter; and the sine wave synthesizer includes the digital filter. The digital filter is configured to adjust at least one of a cycle of the sine wave and amplitude of the sine wave using the sampling frequency signal and a plurality of coefficients of the digital filter; and generate an adjusted sine wave.

19 Claims, 9 Drawing Sheets

(56) References Cited

U.S. PATENT DOCUMENTS

| | | |
|---|---|---|
| 8,736,202 B2 | 5/2014 | Murata |
| 2011/0075835 A1* | 3/2011 | Hill .................. H04M 1/72563 379/418 |
| 2012/0232780 A1 | 9/2012 | Delson et al. |
| 2014/0064516 A1 | 3/2014 | Cruz-Hernandez et al. |
| 2014/0132186 A1 | 5/2014 | Tazartes |
| 2014/0152429 A1 | 6/2014 | Bhatia et al. |
| 2014/0167941 A1 | 6/2014 | Rank et al. |

OTHER PUBLICATIONS

"FAH4830—Haptic Driver for DC Motors (ERMs) and Linear Resonant Actuators (LRAs)," Fairchild Semiconductor Corporation, 2013, pp. 1-15.

Xin, Leon, "Feel the Real World," Texas Instruments Haptics Application, Nov. 2012, pp. 1-28.

* cited by examiner

VIBRATION CONTROL DEVICE AND COMPUTING DEVICE INCLUDING THE SAME

CROSS-REFERENCE TO RELATED APPLICATION

This application claims priority under 35 U.S.C. §119 from Korean Patent Application No. 10-2015-0065087 filed on May 11, 2015, in the Koran Intellectual Property Office, the disclosure of which is hereby incorporated by reference in its entirety.

BACKGROUND

Some non-limiting example embodiments of the present inventive concepts relate to a vibration control device, which controls a vibration element that can be driven by a sine wave, and more particularly to a vibration control device, which can improve a haptic function provided by the vibration element by simply changing at least one of a cycle of the sine wave and an amplitude of the sine wave using a digital filter; and a computing device including the same.

In recent years, it is common to use a device in a touch mode that performs an input by touching an electronic product according to a request of a user who intends to simply use an electronic device.

A haptic feedback device includes a concept of reflecting a user's intuitive experience onto an interface and further diversifying feedback for a touch in addition to a concept of performing an input by touching. At this time, the haptic feedback device has many advantages of space saving, improvement in operation and simplicity, and easy interoperability with information technology (IT) equipment in addition to a simple change in specification and user's high awareness.

Because of these advantages, the haptic feedback device is widely used in electronic devices, such as, including but not limited to, a computer, communication services, medical treatment, and mobile. In general, the haptic feedback device delivers a haptic perception to a user by adding vibration when the user presses a touch panel using a finger. Moreover, a method of installing an additional pressure sensor, or installing an additional actuator mounted with a sense layer on the other side of a drive unit to be adjacent to a display panel is used, so as to deliver an advanced haptic feeling to a user are often employed in order to increase a feedback effect for a user.

SUMMARY

Some of non-limiting example embodiments of the inventive concepts are directed towards a vibration control device configured to provide a haptic function and control a vibration device driven by a sine wave.

In some non-limiting example embodiments, the vibration control device includes a sampling frequency signal generator and a sine wave synthesizer. The sampling frequency signal generator is configured to generate a sampling frequency signal related to an operation frequency of a digital filter using a clock signal. The sine wave synthesizer includes the digital filter, and is configured to adjust at least one of a frequency of the sine wave and an amplitude of the sine wave using the sampling frequency signal, and a plurality of coefficients of the digital filter. The digital filter is further configured to generate an adjusted sine wave.

The plurality of coefficients includes first coefficients related to amplitude of the sine wave and second coefficients related to a cycle of the sine wave. The sine wave synthesizer further includes a filter controller that is configured to change at least one of the first coefficients and the second coefficients and output the changed at least one coefficient to the digital filter. The digital filter adjusts at least one of the cycle of the sine wave and the amplitude of the sine wave using the changed at least one coefficient.

In some non-limiting example embodiments of the inventive concepts, the vibration device may be a linear resonant actuator or a piezoelectric actuator. In some non-limiting example embodiments of the inventive concepts the digital filter may be an infinite impulse response (IIR) filter, a finite impulse response (FIR) filter, or an $n^{th}$ digital filter, where n is equal to or greater than 2.

When the digital filter is embodied in the IIR filter, the IIR filter includes first multipliers configured to use first coefficients, among the plural of coefficients, related to the amplitude of the sine wave, and second multipliers configured to use second coefficients, among the plurality of coefficients, related to the cycle of the sine wave, when at least one of the first coefficients and the second coefficients are changed. In some non-limiting example embodiments, the digital filter adjusts at least one of the cycle of the sine wave and the amplitude of the sine wave using the changed at least one coefficient, and generates an adjusted sine wave. The IIR filter may further include a level shifter, which can adjust a level of the adjusted sine wave.

The vibration control device may further include a sampling frequency signal adjuster configured to receive the sampling frequency signal output from the sampling frequency signal generator. In some non-limiting example embodiments, the sampling frequency signal adjuster may change the sampling frequency signal using a division value, which is generated based on the sampling frequency signal and an output signal of the vibration device. When the vibration device is a piezoelectric actuator, at least one of the first coefficients and the second coefficients is changed by the filter controller whenever a phase of the sine wave is changed by 180 degrees.

In some non-limiting example embodiments of the inventive concepts, the digital filter is configured to adjust at leak one of (i) an amplitude of a signal waveform using an input signal and first coefficients and (ii) a cycle of the signal waveform using the input signal and second coefficients, wherein the second coefficients are different from the first coefficients; and output the adjusted signal waveform to a vibration device.

In some non-limiting example embodiments of the inventive concepts, the digital filter is further configured to, multiply the input signal with a first coefficient of the first coefficients to generate a first output signal; add the first output signal and a second output signal to generate a combined output signal; and multiply the combined output signal with a second coefficient of the first coefficients to generate the adjusted signal waveform. In some non-limiting example embodiments of the inventive concepts, the signal waveform is a sine wave.

BRIEF DESCRIPTION OF THE DRAWINGS

The foregoing and/or other features and advantages will become apparent from the more particular description of the non-limiting example embodiments of the inventive concepts, as illustrated in the following description of the embodiments, taken in conjunction with the accompanying drawings in which like reference characters refer to like parts throughout the different views. The drawings are not necessarily to scale, emphasis instead being placed upon illustrating principals of the example embodiments of the inventive concepts. In the drawings.

DETAILED DESCRIPTION OF THE EMBODIMENTS

Hereinafter, reference will now be made in detail to the non-limiting example embodiments of the present general inventive concepts, examples of which are illustrated in the accompanying drawings, wherein the like reference numerals refer to the like elements throughout. The non-limiting example embodiments are described below in order to explain the present general inventive concepts by referring to the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, the term "and/or" includes any and all combinations of one or more of the associated listed.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Unless otherwise defined, all terms used herein, including technical and scientific terms, have the same meaning as commonly understood by one of ordinary skill in the art to which the inventive concept belongs. It will he further understood that terms, such as those defined in commonly used dictionaries, should he interpreted as having a meaning that is consistent with their meaning in the context of the relevant art and will not be interpreted in an idealized or overly formal sense unless expressly so defined herein.

Figure 1:
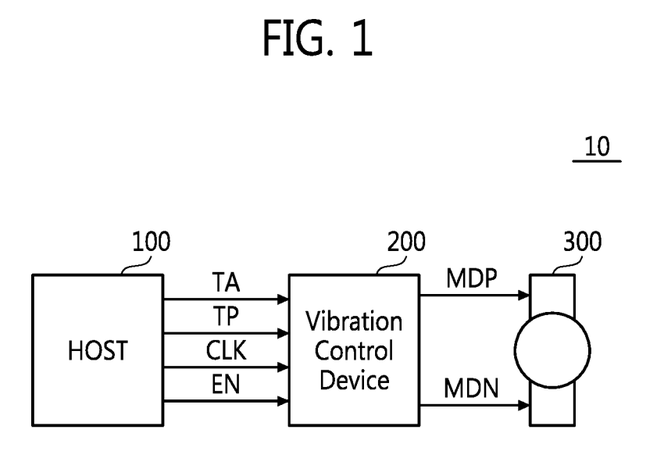
FIG. 1 shows a schematic block diagram of a computing device according to an example embodiment of the present inventive concepts.

FIG. 1 illustrates a schematic block diagram of a computing device according to a non-limiting example embodiment of the present inventive concepts. Referring to FIG. 1, a computing device 10 may include a host 100, a vibration control device 200, and a vibration device 300.

The computing device 10 may be embodied in devices including but not limited to a personal computer (PC) or a mobile computing. The mobile computing device may he for example, but not limited to, a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, an internet of things (IoT) device, an internet of everything (IoE) device, or an e-book.

The host 100 may be a device which can generate various types of control signals, such as target amplitude information (TA), target period information (TP), a clock signal (CLK), and an enable signal (EN), for controlling the vibration control device 200.

The host 100 may transmit the target amplitude information TA on a sine wave, which drives the vibration device 300, and the target cycle (or period) information TP on the sine wave. The host 100 may also transmit the clock signal CLK, and the vibration control device enable signal EN to the vibration control device 200.

The host 100 may set at least one of the target amplitude information TA and the target cycle information TP, so as to be driven by a sine wave having the target amplitude information TA, and the target cycle information TP. The host 100 may also provide a haptic function, which corresponds to the sine wave. According to some non-limiting example embodiments of the inventive concepts, at least one of the target amplitude information TA and the target cycle information TP may be set by an input of a user of the computing device 10. That is, the target amplitude information TA and the target cycle information TP may be programmable values.

The vibration control device 200 may be enabled in response to a vibration control device enable signal EN output from the host 100, and may not be enabled without receiving a transmitted vibration control device enable signal EN. In some non-limiting example embodiments, the vibration control device 200 may be e bodied in an integrated circuit IC, a system on chip (SoC), or a chip set; however, it is not limited thereto. According to some non-limiting example embodiments, the vibration control device 200, which can control an operation of the vibration device 300 may be embodied in a part of the host 100, and may be embodied in a separate chip from the host 100.

The vibration control device 200 may generate a sampling frequency signal (FS of FIG. 2) related to an operation cycle (or period) of a digital filter (240 of FIG. 2) included in the vibration control device 200 using a clock signal CLK. In some non-limiting example embodiments of the inventive concepts, the vibration control device 200 may gene e a sampling frequency signal (FS of FIG. 2) by dividing the clock signal CLK by any division ratio.

Figure 2:
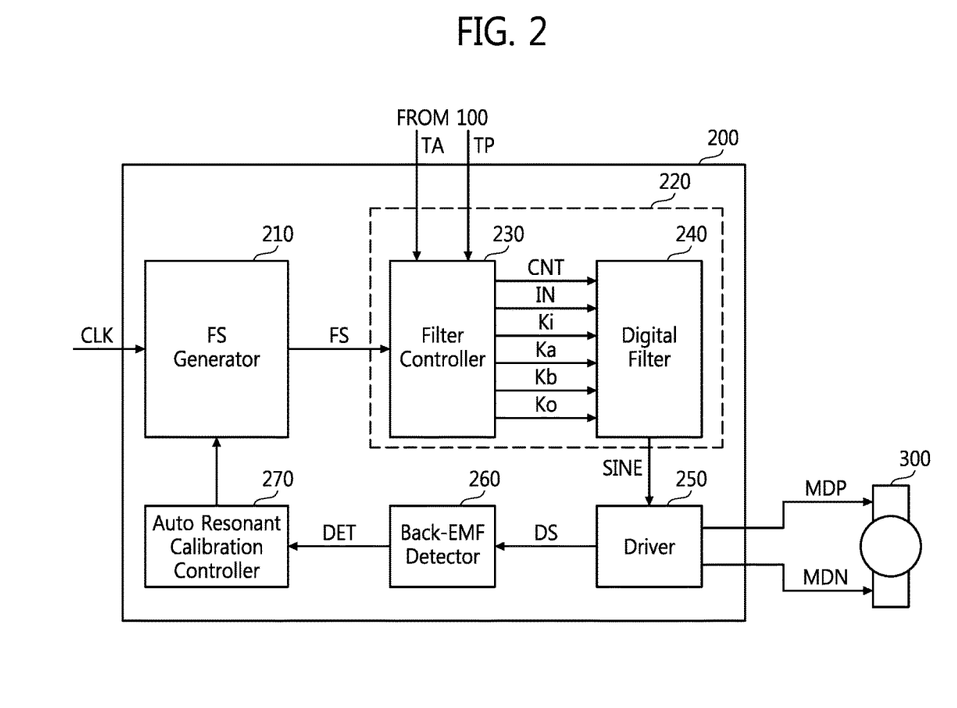
FIG. 2 is a schematic block diagram of a vibration control device shown in FIG. 1 according to an example embodiment of the present inventive concepts.

The vibration control device 200 may change at least one of a plurality of coefficients used in the digital filter 240, illustrated in FIG. 2, so as to generate a sine wave corresponding to the target amplitude information TA and the target cycle information TP output from the host 100. At this time, the plurality of coefficients may include a plurality of first coefficients, which can adjust amplitude of the sine wave and a plurality of second coefficients that can adjust a cycle of the sine wave.

The vibration control device 200 may change at least one of the first coefficients, and adjust amplitude of a sine wave so that the amplitude accords with a target amplitude corresponding to the target amplitude information TA. The vibration control device 200 may change at least one of the second coefficients, and adjust a cycle of a sine wave so that the cycle accords with a target cycle corresponding to the target cycle information TP. That is, the vibration control device 200 may adjust at least one of the amplitude and the cycle of a sine wave.

The vibration control device 200 may transmit output signals, such as a positive motor drive signal (MDP) and a negative motor drive signal (MDN), corresponding to a sine wave having a target amplitude and a target cycle to the vibration device 300.

The vibration device 300 may receive the positive motor drive signal (MDP) and the negative motor drive signal (MDN) from the vibration control device 200, and provide a user with a haptic function corresponding to at least one of the positive motor drive signal (MDP) and the negative motor drive signal (MDN).

The vibration device 300 may be a vibration element which can provide a haptic function and can be driven by a sine wave signal. In some non-limiting example embodiments of the inventive concepts, the vibration element may be a linear resonant actuator (LRA) or a piezoelectric actuator.

FIG. 2 is a schematic block diagram of the vibration control device shown in FIG. 1 according to a non-limiting example embodiment of the present inventive concepts. Referring to FIGS. 1 and 2, the vibration control device 200 may include a sampling frequency signal generator 10, a sine wave synthesizer 220, a driver 250, a back-EMF detector 260, and an auto resonant calibration controller 270. At this time, the sine wave synthesizer 22.0 may include a filter controller 230 and a digital filter 240.

The sampling frequency signal generator 210 may generate a sampling frequency signal FS related to an operation cycle of the digital filter 240 using an external clock signal CLK, and transmit the sampling frequency signal FS to the filter controller 230. According to some non-limiting example embodiment, the sampling frequency signal generator 210 may divide the external clock signal CLK by a predetermined division ratio, and generate a sampling frequency signal FS corresponding to a result of the division.

The filter controller 230 may receive a sampling frequency signal FS from the sampling frequency signal generator 210, and receive the target amplitude information TA of a sine wave and the target cycle information TP of the sine wave for driving the vibration device 300 from the host 100.

The filter controller 230 may change at least one of first coefficients Ki and/or Ko, which are used in the digital filter 240 and related to an amplitude of a sine wave. The filter controller 230 may then output the changed at least one of first coefficients Ki and/or Ko to the digital filter 240 such that the sine wave output from the sine wave synthesizer 220 has a target amplitude corresponding to the target amplitude information TA.

The filter controller 230 ma change at least one of second coefficients Ka and/or Kb, which are used in the digital filter 240 and related to a cycle of a sine wave. The filter controller 230 may then output the at least one of second coefficients Ka and/or Kb to the digital filter 240 so that the sine wave output from the sine wave synthesizer 220 has a target cycle corresponding to the target cycle information TP.

The filter controller 230 may generate a control signal CNT for the digital filter 240 and an input signal IN for the digital filter 240, and output the control signal CNT and the input signal IN to the digital filter 240. At this time, the input signal IN may be an impulse signal, and the control signal CNT is a signal, which can control each of the components included in the digital filter 240. In some non-limiting example embodiments of the inventive concepts, the control signal CNT may be a signal for resetting a delay circuit (246 and/or 247, illustrated in FIG. 3) included in the digital filter 240.

According to some non-limiting example embodiment of the inventive concepts, when the vibration device 300 is a piezoelectric actuator, the filter controller 230 may change at least one of first coefficients related to an amplitude of a sine wave and second coefficients related to a cycle of the sine wave whenever a phase of the sine wave output from the sine wave synthesizer 220 is changed by 180 degrees. At this time, the digital filter 240 may reset each of the delay circuits (246 and/or 247, illustrated in FIG. 3) included in the digital filter 240 in response to a control signal CNT whenever the phase of the sine wave is changed by 180 degrees.

When the vibration device 300 is a piezoelectric actuator, the vibration control device 200 may further include a ring buffer which can adjust a cycle and amplitude of a sine wave.

The digital filter 240 may adjust at least one of a cycle of a sine wave and an amplitude of the sine wave, which are output from the sine wave synthesizer 220 using at least one of the first coefficients Ki and/or Ko and/or at least one of the second coefficients Ka and/or Kb output from the filter controller 230. The digital filter 240 may output a sine wave SINE, adjusted according to the at least one of the coefficients, to the driver 250.

According to some non-limiting example embodiments of the inventive concepts, the digital filter 240 may include first multipliers each of which sets each of the first coefficients Ki and Ko as a gain, and second multipliers each of which sets each of the second coefficients Ka and Kb as a gain.

Even though it is illustrated and described that the two coefficients related to an amplitude of a sine wave and the two coefficients related to a cycle of the sine wave in FIG. 2; however, a technical concept of the present inventive concepts according to some non-limiting example embodiments of the inventive concepts is not limited to the number of coefficients used in the digital filter 240, and the number of the coefficients can be variously changed according to a design specification.

According to some non-limiting example embodiments of the inventive concepts, the digital filter 240 may be an infinite impulse response (IIR) filter or a finite impulse response (FIR) filter. According to some non-limiting example embodiments of the inventive concepts, the digital filter 240 may be an $n^{th}$ digital filter, where n is equal to or greater than 1.

The driver 250 may process a sine wave (SINE) output from the digital filter 240, and transmit at least one of a positive motor drive signal (MDP) and a negative motor drive signal (MDN), which correspond to a processed sine wave to the vibration device 300. That is, the driver 250 may convert the sine wave SINE output from the digital filter 240 into signals that can be used in the vibration device 300, and transmit the converted signals to the vibration device 300. The driver 250 may mediate transmission and reception of a signal between the digital filter 240 and the vibration device 300.

In some non-limiting example embodiments of the inventive concepts, the driver 250 may include a digital-to-analog converter (DAC), a plurality of amplifiers, and an analog-to-digital converter (ADC).

The driver 250 may receive an analog signal output from the vibration device 300, which is driven by a sine wave SINE output from the sine wave synthesizer 220, and convert the analog signal into a digital signal DS. The driver 250 may transmit the digital signal DS to the back-EMF detector 260.

The back-EMF detector 260 may analyze the digital signal DS, detect back-EMF related to a sine wave SINE, which drives the vibration device 300 according to a result of the analysis, and generate a detection signal DET. The back-EMF detector 260 may transmit the detection signal DET to an auto resonant calibration controller 270.

The auto resonant calibration controller 270 may analyze the detection signal DET and determine a cycle of a sine wave SINE which can maximize an intensity of vibration of the vibration device 300 according to a result of the analysis. The auto resonant calibration controller 270 may analyze the detection signal DET and determine a resonant frequency, which can maximize an intensity of vibration of the vibration device 300 according to a result of the analysis.

The auto resonant calibration controller 270 may transmit a signal, which includes a cycle or the resonant frequency that can maximize an intensity of vibration to the sampling frequency signal generator 210. At this time, the sampling frequency signal generator 210 may set a division ratio based on the signal including the cycle or the resonant frequency, divide an external clock signal CLK according to the division ratio, and generate a sampling frequency signal FS.

According to some non-limiting example embodiments of the inventive concepts, the sampling frequency signal generator 210 may update the sampling frequency signal FS based on a signal including a cycle or a resonant frequency that can maximize an intensity of vibration transmitted from the auto resonant calibration controller 270.

Figure 3:
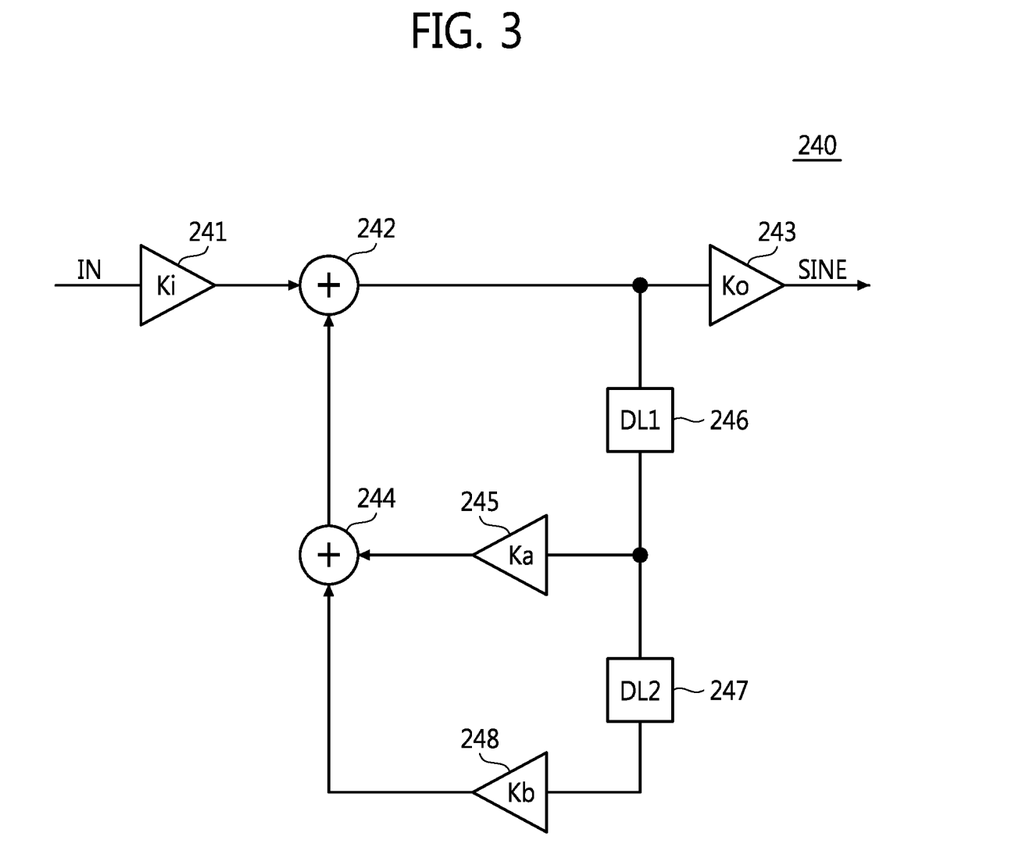
FIG. 3 is a block diagram which shows an example embodiment of a digital filter shown in FIG. 2.

FIG. 3 is a block diagram, which illustrates a non-limiting example embodiment of a digital filter illustrated in FIG. 2. Referring to FIGS. 1 to 3, the digital filter 240 may include a plurality of multipliers 241, 243, 245, and 248, a plurality of adders 242 and 244, and a plurality of delay circuits 246 and 247.

The plurality of multipliers 241, 243, 245, and 248 may include a first multiplier 241, which has a first coefficient Ki as a gain value; a second multiplier 243, which has a second coefficient Ko as a gain value; a third multiplier 245, which has a third coefficient Ka as a gain value; and a fourth multiplier 248, which has a fourth coefficient Kb as a gain value. The plurality of adders 242 and 244 may include a first adder 242 and a second adder 244, and the plurality of delay circuits 246 and 247 may include a first delay circuit 246 and a second delay circuit 247.

In a non-limiting example embodiment of the inventive concepts, each of the first delay circuit 246 and the second delay circuit 247 may be embodied in a D-flip flop. According to some non-limiting example embodiments, a unit clock delay may be generated by at least one of the first delay circuit 246 and the second delay circuit 247.

The first multiplier 241 may receive an impulse signal IN output from the filter controller 230, multiply the impulse signal IN by a first coefficient Ki, and generate a first output signal according to a result of the multiplication.

The first adder 242 may add the first output signal and a second output signal output from the second adder 244, and generate a third output signal according to a result of the addition.

The second multiplier 243 may receive a third output signal output from the first adder 242, multiply the third output signal by the second coefficient Ko, and generate a sine wave SINE according to a result of the multiplication.

The first delay circuit 246 may receive a third output signal output from the first adder 242, delay the third output signal for a first delay time, and generate a fourth output signal according to a result of the delay.

The third multiplier 245 may receive a fourth output signal output from the first delay circuit 246, multiply the fourth output signal by the third coefficient Ka, and generate a fifth output signal according to a result of the multiplication.

The second delay circuit 247 may receive a fourth output signal output from the first delay circuit 246, delay the fourth output signal for a second delay time, and generate a sixth output signal according to a result of the delay. According to some non-limiting example embodiments of the inventive concepts, the first delay time by the first delay circuit 246 and the second delay time by the second delay circuit 247 may be the same as or different from each other.

The fourth multiplier 248 may receive a sixth output signal output from the second delay circuit 247, multiply the sixth output signal by a fourth coefficient Kb, and generate a seventh output signal according to a result of the multiplication.

The second adder 244 may receive a fifth output signal output from the third multiplier 245 and a seventh output signal output from a fourth multiplier 248, add the fifth output signal and the seventh output signal, and generate a second output signal according to a result of the addition. The second adder 244 may output the second output signal to the first adder 242.

The digital filter 240, as illustrated in FIG. 3, is embodied in a secondary infinite impulse response (IIR) filter, and a general Z-conversion for the secondary IIR filter is as shown in Equation 1.

$$H(z) = \frac{B(z)}{A(z)} = \frac{b_0 + b_1 z^{-1} + b_2 z^{-2}}{1 - a_1 z^{-1} - a_2 z^{-2}} \quad \text{[Equation 1]}$$

Referring to Equation 1, a denominator polynomial A(z) has two roots, and the two roots are poles of the secondary IIR filter. When each of poles of H(z) is a complex number, Equation 2 is made by displaying each of the poles in a form of polar coordinates.

$$P_1 = re^{j\theta}$$

$$P_2 = re^{-j\theta} = p_1^* \quad \text{[Equation 2]}$$

Referring to FIGS. 1 to 2, Equation 3 is made by rewriting the denominator polynomial A(z) of H(z) in a form of polar coordinates (a clause of r and θ)

$$A(z) = (1 - p_1 z^{-1})(1- p_2 z^{-1}) \quad \text{[Equation 3]}$$
$$= (1 - re^{-j\theta} z^{-1})(1 - re^{j\theta} z^{-1})$$

-continued $$= 1 - (re^{j\theta} + re^{-j\theta})z^{-1} + r^2z^{-2}$$

$$= 1 - (2r\cos\theta)z^{-1} + r^2z^{-2}$$

Referring to Equations 1 to 3, Equation 4 is made by changing Equation 1 using Equation 3.

$$H(z) = \frac{B(z)}{A(z)} = \frac{b_0 + b_1 z^{-1} + b_2 z^{-2}}{1 - a_1 z^{-1} - a_2 z^{-2}} \quad \text{[Equation 4]}$$

$$= \frac{b_0 + b_1 z^{-1} + b_2 z^{-2}}{(1 - re^{j\theta}z^{-1})(1 - re^{-j\theta}z^{-1})}$$

$$= \frac{b_0 + b_1 z^{-1} + b_2 z^{-2}}{1 - 2r\cos\theta z^{-1} + r^2 z^{-2}}$$

Two feedback coefficients a1 and a2 in Equation 4 are as shown in Equation 5.

$$\alpha_1 = 2r\cos\theta$$

$$\alpha_2 = -r^2 \quad \text{[Equation 5]}$$

Referring to Equations 1 to 5, a difference equation corresponding to Equation 1 is as shown in Equation 6.

$$y[n] = (2r\cos\theta)y[n-1] - r^2 y[n-2] + b_0 x[n] + b_1 x[n-1] + b_2 x[n-2] \quad \text{[Equation 6]}$$

Referring to Equations 1 to 6, a relationship between poles and feedback coefficients a1 and a2 may be known. In some non-limiting example embodiments of the inventive concepts, only a coefficient a1 needs to be changed to change an angle of poles. However, Equation 5 is valid only when two poles are conjugate complex numbers.

In order to obtain a continuous sine wave, poles of a system represented by Equation 1 need to be in a unit circle in a Z-plane. That is, r should be 1. An angle of the poles exactly accords with a radian frequency of a sine wave output.

In Equation 5, a coefficient a2 should b fixed to −1 to obtain a continuous sine wave, and a frequency of the sine wave synthesizer 220 can be controlled by appropriately adjusting a coefficient a1.

Referring to FIG. 3, and Equations 1 to 6, first coefficients Ki and Ko related to an amplitude of a sine wave SINE are a first coefficient Ki and a second coefficient Ko; and second coefficients Ka and Kb related to a cycle of the sine wave SINE are a third coefficient Ka and a fourth coefficient Kb. At this time, the third coefficient Ka is equal to the coefficient a1 shown in Equations 1, 4, and 5 (Ka=a1), and the fourth coefficient Kb is equal to the coefficient a2 shown in Equations 1, 4, and 5 (Kb=a2).

Here, since Ka=2 cos θ=s cos(2π(FT/FS)), the FT is a target frequency, and FS is a sampling frequency. The third coefficient Ka may be changed according to a change in the sampling frequency.

The amplitude of the sine wave SINE may be adjusted by changing at least one of the first coefficient Ki and the second coefficient Ko, and the cycle of the sine wave SINE may be adjusted by changing at least one of the third coefficient Ka and the fourth coefficient Kb.

In some non-limiting example embodiments of the inventive concepts, when each of the first coefficient Ki and the fourth coefficient Kb are fixed to a specific value, the amplitude of the sine wave SINE may be adjusted by changing the second coefficient Ko, and the cycle of the sine wave SINE may be adjusted by changing the third coefficient Ka.

In some non-limiting example embodiments of the inventive concepts, even if each of the third coefficient Ka and the fourth coefficient Kb is fixed to a specific value, the cycle of the sine wave SINE may be adjusted when the sampling frequency FS is changed.

Figure 4:
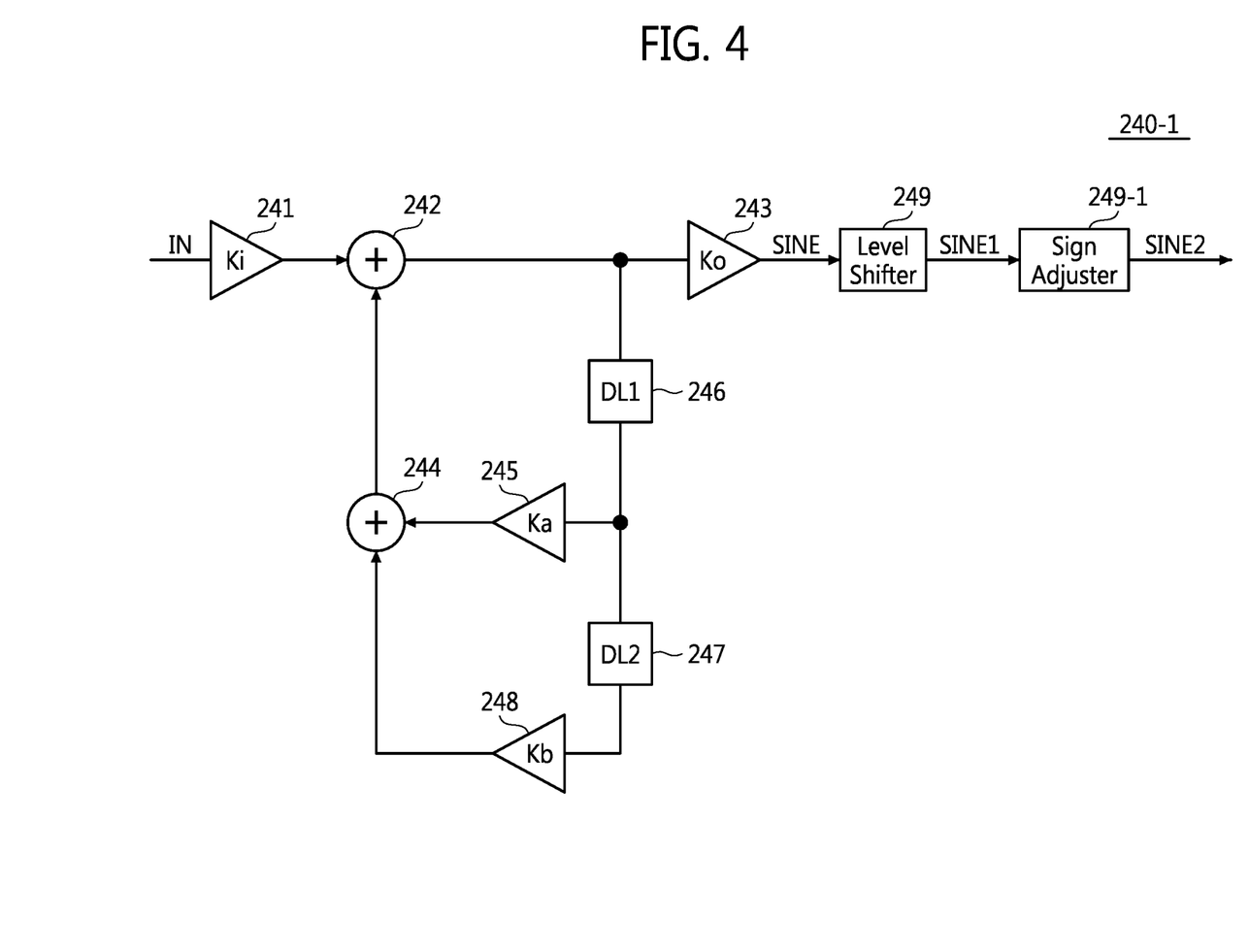
FIG. 4 is a block diagram which shows another example embodiment of the digital filter shown in FIG. 2.

FIG. 4 is a block diagram, which illustrates a non-limiting example embodiment of the digital filter shown in FIG. 2. Referring to FIGS. 3 and 4, except for a shifter 249 and a sign adjuster 249-1, a digital filter 240-1, illustrated in FIG. 4, is similar to the digital filter 240 illustrated in FIG. 3 in structure and operation.

Referring to FIGS. 3 and 4, the digital filter 240-1 may adjust a level of a sine wave SINE output from the second multiplier 243 by using the level shifter 249, and the sine adjuster 249-1.

The level shifter 249 may receive the sine wave SINE output from the second multiplier 243, adjust a level of the sine wave SINE, and generate a level-adjusted sine wave SINE1. For example, an amplitude of the level-adjusted sine wave SINE1 may be 2k times, where k is a natural number, larger than the amplitude of the sine wave SINE. The sign adjuster 249-1 may change a signed sine wave SINE1 into an unsigned sine wave SINE2.

The sine wave SINE2 output through the level shifter 249 and the sign adjuster 249-1 may be transmitted to the driver 250.

Figure 5:
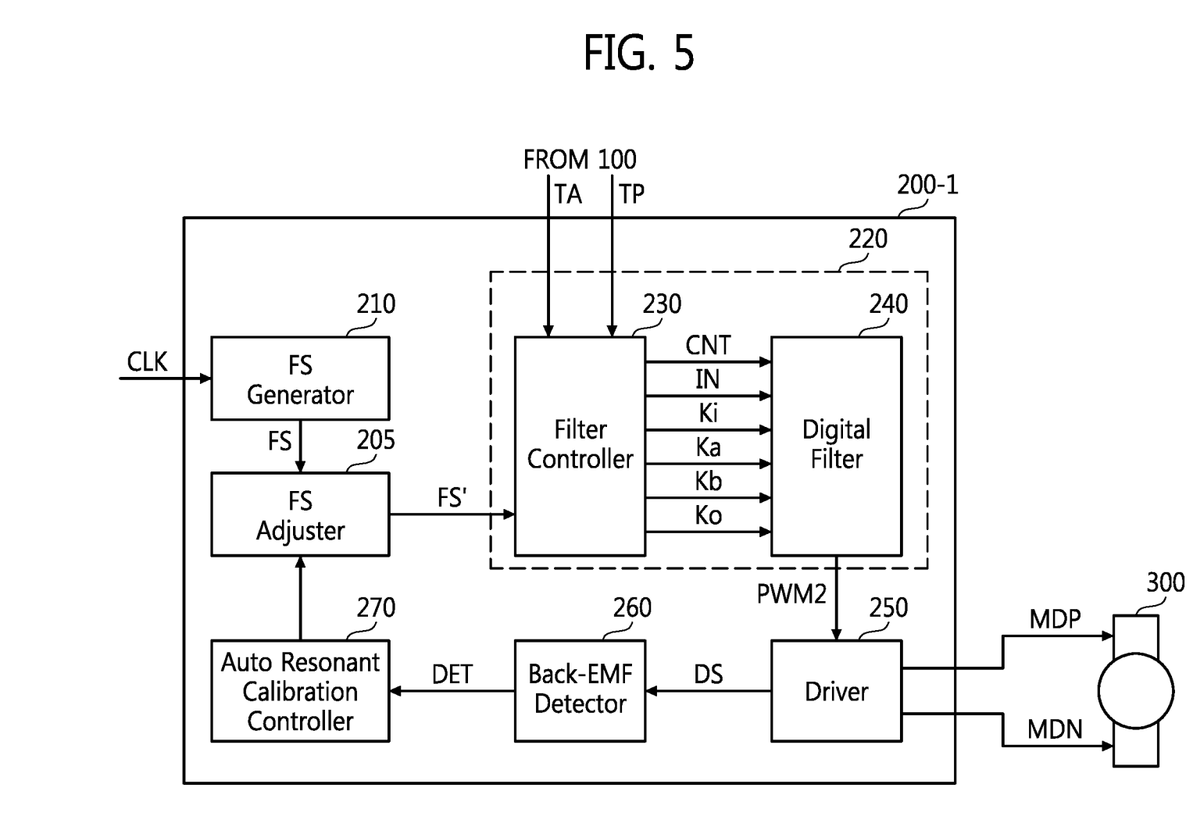
FIG. 5 is a schematic block diagram of the vibration control device shown in FIG. 1 according to another example embodiment of the present inventive concepts.

FIG. 5 is a schematic block diagram of the vibration control device illustrated in FIG. 1 according to another non-limiting example embodiment of the inventive concepts. Referring to FIGS. 1 to 5, a vibration control device 200-1 may include a sampling frequency signal adjuster 205, the sampling frequency signal generator 210, the sine wave synthesizer 220, the driver 250, the back-EMT detector 260, and the auto resonant calibration controller 270. At this time, the sine wave synthesizer 220 may include the filter controller 230 and the digital filter 240.

Except that the vibration control device 200-1, illustrated in FIG. 5, includes the sampling frequency signal adjuster 205, the vibration control device 200-1 illustrated in FIG. 5 is similar, in structure and operation, to the vibration control device 200 illustrated in FIG. 2. That is, each of configurations 220, 250, and 260 included in the vibration control device 200-1 illustrated in FIG. 5 is similar as each of the configurations 220, 250, and 260 included in the vibration control device 200 illustrated in FIG. 4.

The sampling frequency signal generator 210 may generate a sampling frequency signal FS related to an operation cycle of the digital filter 220 using a clock signal CLK, and transmit the sampling frequency signal FS to the sampling frequency signal adjuster 205. According to some non-limiting example embodiments of the inventive concepts, the sampling frequency signal generator 210 may divide an external clock signal CLK by a predetermined division ratio and generate a sampling frequency signal FS.

The auto resonant calibration controller 270 may transmit information including a cycle or a resonant frequency of a sine wave SINE that can maximize an intensity of vibration of the vibration device 300 to the sampling frequency signal adjuster 205.

The sampling frequency signal adjuster 205 may receive a sampling frequency signal FS output from the sampling frequency signal generator 210, and information that includes a cycle or a resonant frequency of a sine wave SINE output from the auto resonant calibration controller 270. The sampling frequency adjuster 205 may change the sampling frequency signal FS using the sampling frequency signal and the information, and generate a changed sampling frequency signal FS'. At this time, the changed sampling frequency signal FS' may be changed from the sampling frequency signal FS so as to adjust the cycle of the sine wave SINE.

The sampling frequency signal adjuster 205 may change the sampling frequency signal FS using a division value generated based on the sampling frequency signal FS and an output signal of the vibration device 300, and generate the changed sampling frequency signal FS'.

The sampling frequency signal adjuster 205 may transmit the changed sampling frequency signal FS' to the filter controller 230 as a signal related to an operation cycle of the digital filter 240.

Figure 6:
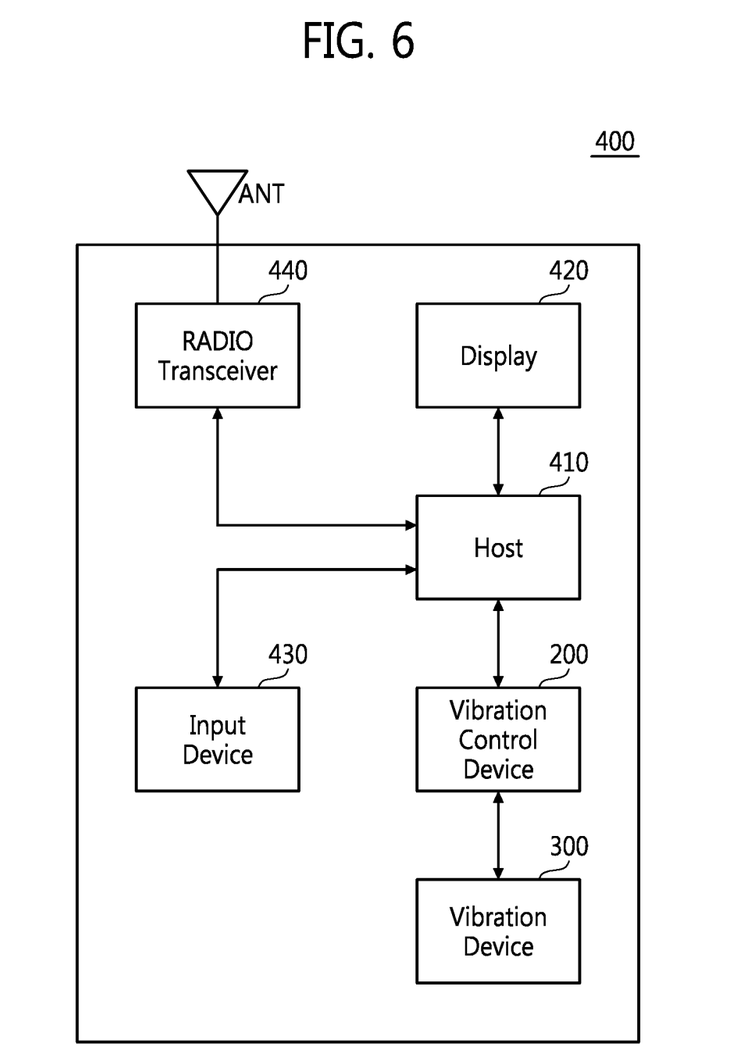
FIG. 6 shows an example embodiment of the computing device which includes the vibration control device shown in FIGS. 1 and 5.

FIG. 6 illustrates a non-limiting example embodiment of the computing device, which includes the vibration control device as illustrated in FIGS. 1 and 5. Referring to FIGS. 1 to 6, a computing device 400 including the vibration control device 200 and the vibration device 300, illustrated in FIG. 1, may be embodied in including, but not limited to, a cellular phone, a smart phone, a personal digital assistant (PDA), an internet of things (IoT) device, an internet of everything (IoE) device, or a wireless communication device.

The computing device 400 may include a host 410, a display 420, an input device 430, a wireless transceiver 440, a vibration device 300, and a vibration control device 200. The host 410 may be the host 100 as illustrated in FIG. 1.

The vibration control device 200 may control a haptic function provided by the vibration device 300 according to a control of the host 410. The host 410 may process data output from the vibration control device 200, and control an operation of the display 420 so that data output from the input device 430 or data output from the wireless transceiver 440 are displayed on the display 420.

Even though the vibration control device 200 is illustrated outside the host 410 in FIG. 6, but the vibration control device 200 may be included as a part of the host 410.

The input device 430 may he embodied in a touch pad, a pointing device such as, including but not limited to, a computer mouse, a touch screen, a keypad, a keyboard, or a joystick, as a device, which can input a control signal for controlling an operation of the host 410 or data to be processed by the host 410.

When the vibration device 300 is embodied in a part of the input device 430, and data to be processed by the host 410 are input through the input device 530 by a user, the vibration device 300 may provide the user with a haptic function. Accordingly, the user may sense pressure, vibration, or movement through the vibration device 300.

The wireless transceiver 440 may transmit or receive a wireless signal to or from an external device through an antenna ANT. In some non-limiting example embodiments of the inventive concepts, the wireless transceiver 440 may change a wireless signal received through the antenna ANT into a signal to be processed by the host 410. Accordingly, the host 410 may process a signal output from the wireless transceiver 440, and transmit the processed signal to the vibration control device 200 or the display 430. The vibration control device 200 may transmit the signal processed by the host 410 to the vibration device 300.

Figure 7:
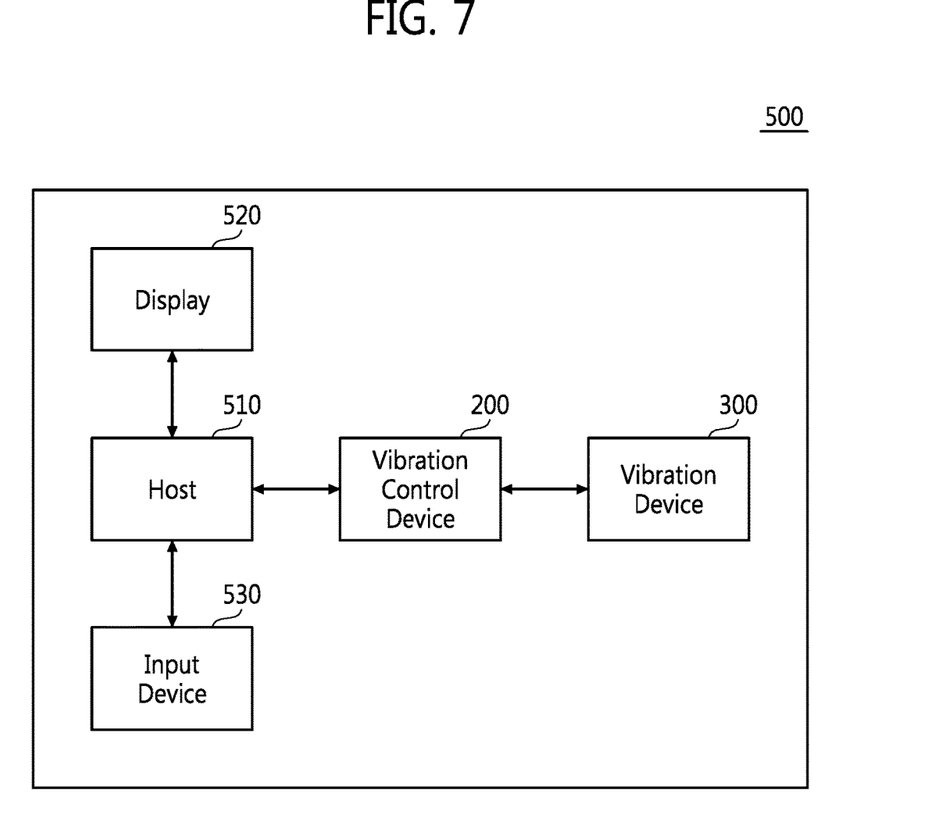
FIG. 7 is another example embodiment of the computing device which includes the vibration control device shown in FIGS. 1 and 5.

FIG. 7 is another non-limiting example embodiment of the computing device, which includes the vibration control device illustrated in FIGS. 1 and 5. Referring to FIGS. 1 to 5, and 7, a computer system 500 including the vibration control device 200 or 200-1, illustrated in FIGS. 1 and 5, may be embodied in, including but not limited to, a PC, a game console, a tablet PC, a net-book, an e-reader, a personal digital assistant (PDA), a portable multimedia player (PMP), a MP3 player, or a MP4 player.

The computer system 500 may include a host 510, the vibration device 300, the vibration control device 200 for controlling a haptic function of the vibration device 300, a display 520, and the input device 530.

The host 510 may display data stored in a memory device on the display 520, according to data input through the input device 530. The host 510 may control a general operation of the computer system 500, and control an operation of the vibration control device 200. The host 510 may be the host 100 illustrated in FIG. 1.

According to some non-limiting example embodiments of the inventive concepts, the vibration control device 200 for controlling an operation of the vibration device 300 may be embodied in a part of the host 510, and may be embodied in a separate chip from the host 510.

The input device 530 may be embodied in, including but not limited to, a touch pad, a pointing device such as a computer mouse, a keypad, a keyboard, or a joystick. According to some non-limiting example embodiments of the inventive concepts, the vibration device 300 may be embodied as a part of the input device 530 and may be embodied in a separate chip from the input device 530.

When the vibration device 300 is embodied in a part of the input device 530, and data to be processed by the host 510 are input through the input device 530 by a user, the vibration device 300 may provide the user with a haptic function. Accordingly, the user may sense pressure, vibration, or movement through the vibration device 300.

Figure 8:
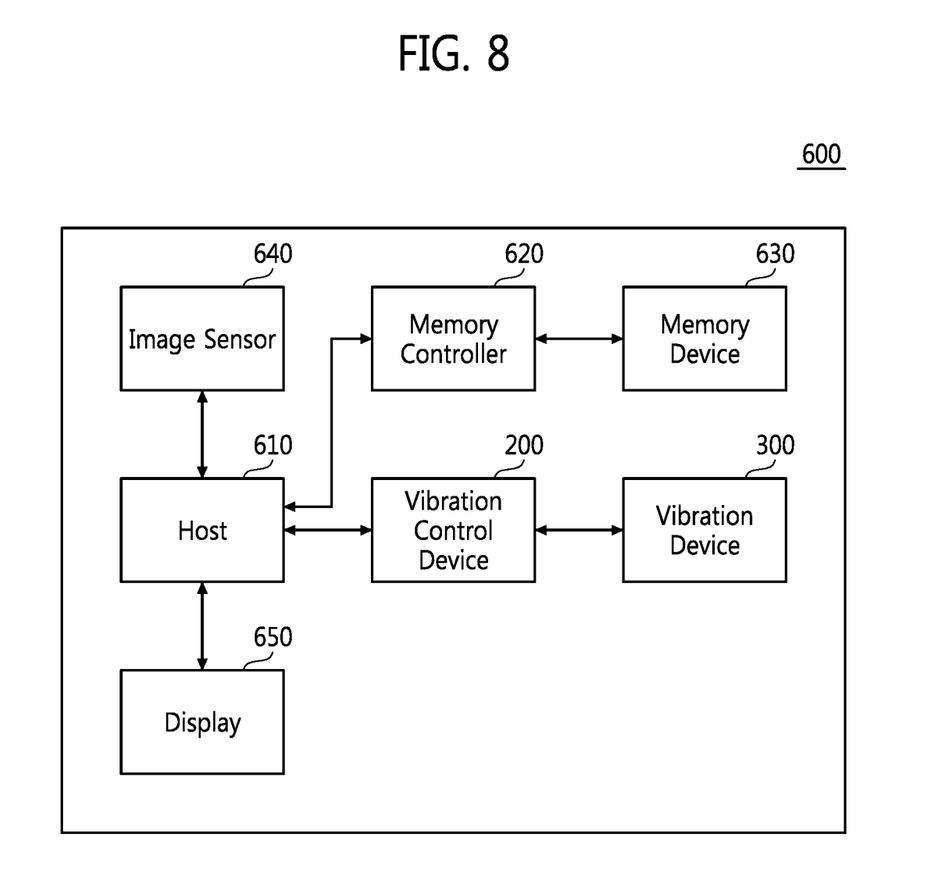
FIG. 8 is another example embodiment of the computing device which includes the vibration control device shown in FIGS. 1 and 5.

FIG. 8 is another non-limiting example embodiment of the computing device, which includes the vibration control device illustrated in FIGS, 1 and 5. Referring to FIGS, 1 to 5, and 8, a computing device 600 including the vibration control device 200 or 200-1, illustrated in FIGS. 1 and 5, may he embodied in an image process device such as, including but not limited to, a digital camera, or a cellular phone or a smart phone embedded with a digital camera, The computing device 600 may include a host 610, a memory controller 620, a memory device 630, an image sensor 640, a display 650, the vibration control device 200, and the vibration device 300. The vibration control device 200 may control a haptic function provided by the vibration device 300 according to a control of the host 610.

The memory controller 620 may control a data processing operation, e.g., a write operation or a read operation, of the memory device 630. Moreover, data stored in the memory device 630 may be displayed on the display 650 according to a control of the host 610 or the memory controller 620. According to some non-limiting example embodiments of the inventive concepts, the memory controller 620 may be embodied in a part of the host 610 and may be embodied in a separate chip from the host 610.

The image sensor 640 converts an optical image into digital signals, and the converted digital signals are transmitted to the host 610 or the memory controller 620. According to a control of the host 610, the converted digital signals may be displayed on the display 650, or may be stored in the memo' device 630 through the memory controller 620.

Figure 9:
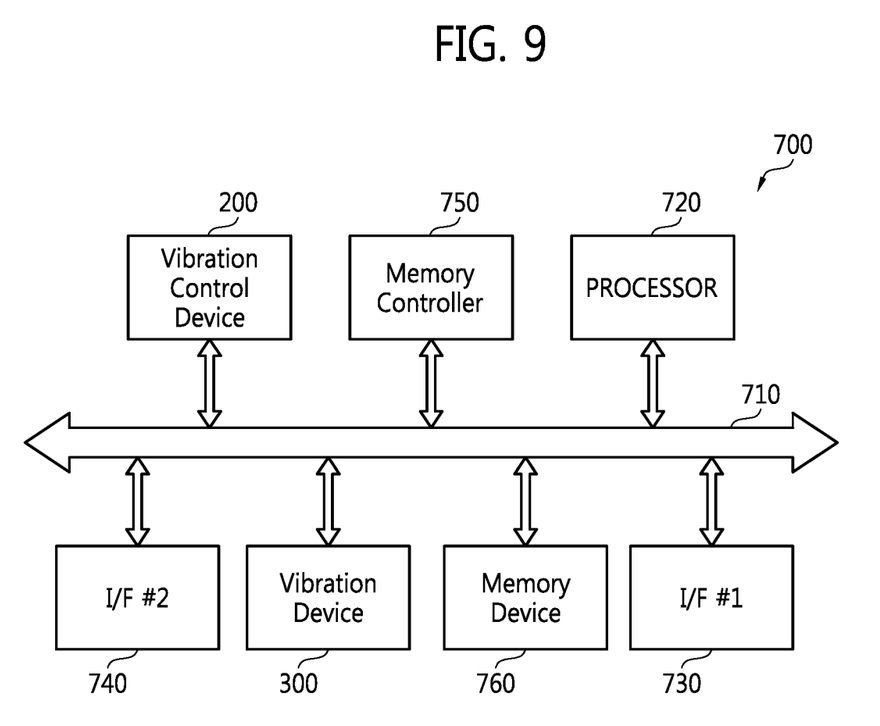
FIG. 9 is another example embodiment of the computing device which includes the vibration control device shown in FIGS. 1 and 5.

FIG. 9 is another non-limiting example embodiment of the computing device, which includes the vibration control device illustrated in FIGS. 1 and 5. Referring to FIGS. 1 to 5, and 9, a computing device 700 may include a processor 720 connected to a data bus 710, a first interface 730, a second interface 740, a memory controller 750, a memory device 760, the vibration control device 200, and the vibration device 300. The vibration control device 200 may control a haptic function provided by the vibration device 300 according to a control of the processor 720.

According to some non-limiting example embodiments of the inventive concepts, the computing device 700 may include a portable device such as, including but not limited to, a cellular phone, a MPEG Audio Layer-3 (MP3) player, a MPEG Audio Layer-4 (MP4) player, personal digital assistants (PDA), or a portable media player (PMP). According to some non-limiting example embodiments of the inventive concepts, the computing device 700 may include a data process system such as, including but not limited to, a personal computer (PC), a note-type personal computer, or a laptop computer.

According to some non-limiting example embodiments of the inventive concepts, the memory controller 750 may write data input through the first interface 730 in the memory device 760 according to a control of the processor 720. According to some non-limiting example embodiments of the inventive concepts, the memory controller 750 may read data from the memory device 760, and output the read data to an external device through the first interface 730 according to a control of the processor 720. In this case, the first interface 730 may be an input/output device.

The second interface 740 may be an interface for wireless communication. According to some non-limiting example embodiments of the inventive concepts, the second interface 740 may be embodied in software or firmware.

A vibration control device which controls a vibration element driven by a sine wave according to some non-limiting example embodiments of the inventive concepts may improve a haptic function provided by the vibration element by simply changing a cycle of the sine wave, and amplitude of the sine wave using a digital filter.

Although a few non-limiting example embodiments of the present general inventive concepts have been illustrated and described, it will be appreciated by those skilled in the art that changes may be made in these embodiments without departing from the principles and spirit of the general inventive concepts, the scope of which are defined in the appended claims and their equivalents.

What is claimed is:

1. A vibration control device configured to provide a haptic function and control a vibration device driven by a sine wave, the vibration control device comprising:
    a sampling frequency signal generator configured to generate a sampling frequency signal using a clock signal, the sampling frequency signal related to an operation cycle of a digital filter; and
    a sine wave synthesizer includes the digital filter, the sine wave synthesizer configured to,
        adjust at least one of (i) a cycle of the sine wave and (ii) an amplitude of the sine wave, using the sampling frequency signal and a plurality of coefficients of the digital filter, and
        generate an adjusted sine wave.

2. The vibration control device of claim 1, wherein,
    the plurality of coefficients include first coefficients and second coefficients, the first coefficients are related to the amplitude of the sine wave, and the second coefficients are related to the cycle of the sine wave; and
    the sine wave synthesizer further includes a filter controller, the filter controller is configured to,
        change at least one of (i) the first coefficients and (ii) the second coefficients, and
        output the changed at least one coefficient to the digital filter; and
    the digital filter is configured to adjust the at least one of (i) the cycle of the sine wave and (ii) the amplitude of the sine wave, using the changed at least one coefficient.

3. The vibration control device of claim 1, wherein the vibration device is one of a linear resonant actuator (LRA) and a piezoelectric actuator.

4. The vibration control device of claim 1, wherein the digital filter is one of an infinite impulse response (IIR) filter and a finite impulse response (FIR) filter.

5. The vibration control device of claim 1, wherein the digital filter is an $n^{th}$ digital filter, where n is equal to or greater than 1.

6. The vibration control device of claim 4, wherein, when the digital filter is embodied in the IIR filter, the IIR filter includes:
    first multipliers configured to use first coefficients related to the amplitude of the sine wave among the plurality of coefficients; and
    second multipliers configured to use second coefficients related to the cycle of the sine wave among the plurality of coefficients,
    wherein, when at least one of (i) the first coefficients and (ii) the second coefficients is changed, then at least one of (i) the cycle of the sine wave and (ii) the amplitude of the sine wave is adjusted using the changed at least one coefficient, and the adjusted sine wave is generated.

7. The vibration control device of claim 6, wherein the filter further includes a level shifter for adjusting a level of the adjusted sine wave.

8. The vibration control device of claim 1, further comprising:
    a sampling frequency signal adjuster configured to,
        receive the sampling frequency signal output from the sampling frequency signal generator, and
        change the sampling frequency signal using a division value generated based on the sampling frequency signal and an output signal of the vibration device.

9. The vibration control device of claim 2, wherein, when the vibration device is a piezoelectric actuator, at least one of (i) the first coefficients and (ii) the second coefficients is changed by the filter controller whenever a phase of the sine wave is changed by 180 degrees.

10. A computing device comprising:
    a vibration device configured to provide a haptic function and be driven by a sine wave;
    a vibration control device configured to control the vibration device, the vibration control device including,
        a sampling frequency signal generator configured to generate a sampling frequency signal using a clock signal, the sampling frequency signal related to an operation cycle of a digital filter, and
        a sine wave synthesizer includes the digital filter, the sine wave synthesizer configured to,
            adjust at least one of (i) a cycle of the sine wave and (ii) an amplitude of the sine wave, using the sampling frequency signal and a plurality of coefficients of the digital filter, the cycle of the sine wave accords with a target cycle and the amplitude of the sine wave accords with a target amplitude, and
            generate an adjusted sine wave; and
    a host configured to transmit the clock signal, the target amplitude of the sine wave, and the target cycle of the sine wave to the vibration control device.

11. The computing device of claim 10, wherein,
the plurality of coefficients include first coefficients and second coefficients, the first coefficients related to the amplitude of the sine wave, and the second coefficients related to the cycle of the sine wave; and
the sine wave synthesizer further includes a filter controller, the filter controller is configured to,
  change at least one of (i) the first coefficients and (ii) the second coefficients, and
  output the changed at least one coefficient to the digital filter; and
the digital filter is configured to adjust the at least one of (i) the cycle of the sine wave and (ii) the amplitude of the sine wave, using the changed at least one coefficient.

12. The computing device of claim 10, wherein the target amplitude and the target cycle are programmable values.

13. The computing device of claim 10, wherein the vibration device is one of a linear resonant actuator (LRA) and a piezoelectric actuator.

14. The computing device of claim 10, wherein the digital filter is one of an infinite impulse response (IIR) filter and a finite impulse response (FIR) filter.

15. The computing device of claim 10, wherein when digital filter is embodied in a IIR filter, the IIR filter includes:
  first multipliers configured to use first coefficients related to the amplitude of the sine wave among the plurality of coefficients; and
  second multipliers configured to use second coefficients related to the cycle of the sine wave among the plurality of coefficients,
  wherein, when at least one of (i) the first coefficients and (ii) the second coefficients is changed, at least one of (i) the cycle of the sine wave and (ii) the amplitude of the sine wave is adjusted using the changed at least one coefficient, and the adjusted sine wave is generated.

16. A vibration control device, comprising:
a digital filter configured to,
  adjust at least one of (i) an amplitude of a signal waveform using an input signal and first coefficients and (ii) a cycle of the signal waveform using the input signal and second coefficients, the second coefficients being different from the first coefficients; and
  output the adjusted signal waveform to a vibration device;
wherein the digital filter is further configured to,
  multiply the input signal with a first coefficient of the first coefficients to generate a first output signal;
  add the first output signal and a second output signal to generate a combined output signal; and
  multiply the combined output signal with a second coefficient of the first coefficients to generates the adjusted signal waveform.

17. The vibration control device of claim 16, wherein
the signal waveform is a sine wave, and
the vibration device is one of a linear resonant actuator (LRA) and a piezoelectric actuator.

18. The vibration control device of claim 16, wherein the digital filter is one of (i) an infinite impulse response (IIR) filter and (ii) a finite impulse response (FIR) filter.

19. The vibration control device of claim 16, wherein the digital filter is an $n^{th}$ digital filter, where n is equal to or greater than 1.

* * * * *